United States Patent [19]
DeWaard

[11] Patent Number: 6,105,536
[45] Date of Patent: Aug. 22, 2000

[54] WASH SYSTEM, APPARATUS AND METHOD FOR A ROTARY MILKING APPARATUS

[76] Inventor: Dave DeWaard, 8896 Depot Rd., Lynden, Wash. 98264

[21] Appl. No.: 09/122,482

[22] Filed: Jul. 23, 1998

Related U.S. Application Data

[60] Provisional application No. 60/083,561, Apr. 29, 1998.

[51] Int. Cl.$^7$ ........................................ A01J 3/00
[52] U.S. Cl. ...................... 119/14.04; 119/14.18
[58] Field of Search ............... 119/14.04, 14.18

[56] References Cited

U.S. PATENT DOCUMENTS

| | | | |
|---|---|---|---|
| 1,787,152 | 12/1930 | Hapgood | 119/14.04 |
| 2,305,259 | 12/1942 | Jeffers | 119/14.04 |
| 3,752,122 | 8/1973 | Ciribelli | 119/14.04 |
| 3,835,814 | 9/1974 | Jacobs et al. | 119/14.04 |
| 3,851,663 | 12/1974 | Neuko | 137/580 |
| 3,880,120 | 4/1975 | Shulick | 119/14.04 |
| 3,999,517 | 12/1976 | Andersson | 119/14.04 |
| 4,098,526 | 7/1978 | DuBois | 285/119 |
| 4,145,992 | 3/1979 | Rafaely | 119/14.04 |
| 5,000,119 | 3/1991 | Moreau et al. | 119/14.03 |
| 5,167,201 | 12/1992 | Peles | 119/14.18 |
| 5,678,506 | 10/1997 | Berg et al. | 119/14.18 |
| 5,718,185 | 2/1998 | Pichler et al. | 119/14.04 |

FOREIGN PATENT DOCUMENTS

| | | | |
|---|---|---|---|
| 1391347 | 4/1975 | New Zealand | 119/14.04 |
| 7907072 | 3/1981 | New Zealand | 119/14.04 |
| 1308644 | 2/1973 | United Kingdom | 119/14.04 |
| 1398596 | 6/1975 | United Kingdom | 119/14.04 |
| 2016253 | 9/1979 | United Kingdom | 119/14.04 |

*Primary Examiner*—Peter M. Poon
*Assistant Examiner*—Judith A. Nelson
*Attorney, Agent, or Firm*—Robert B. Hughes; Hughes & Schacht, P.S.

[57] ABSTRACT

A rotary milking apparatus having a rotating support structure having a plurality of milking stations, each having a milking unit and a wash unit. Each wash unit has a washing connecting device positioned to travel in a circumferential path of travel through a washing location There is a wash control valve for each wash unit having a first location to cause milk to be deliverd from the milking unit to a collecting location, and a second position to enable wash liquid to be delivered to the milking unit. There is a single wash liquid supply section having a nozzle which travels in an arcuate back and forth pass to travel to connect to the connecting device of each wash unit. The wash liquid supply section delivers wash liquid individually to each wash unit as it passes through the wash location.

23 Claims, 8 Drawing Sheets

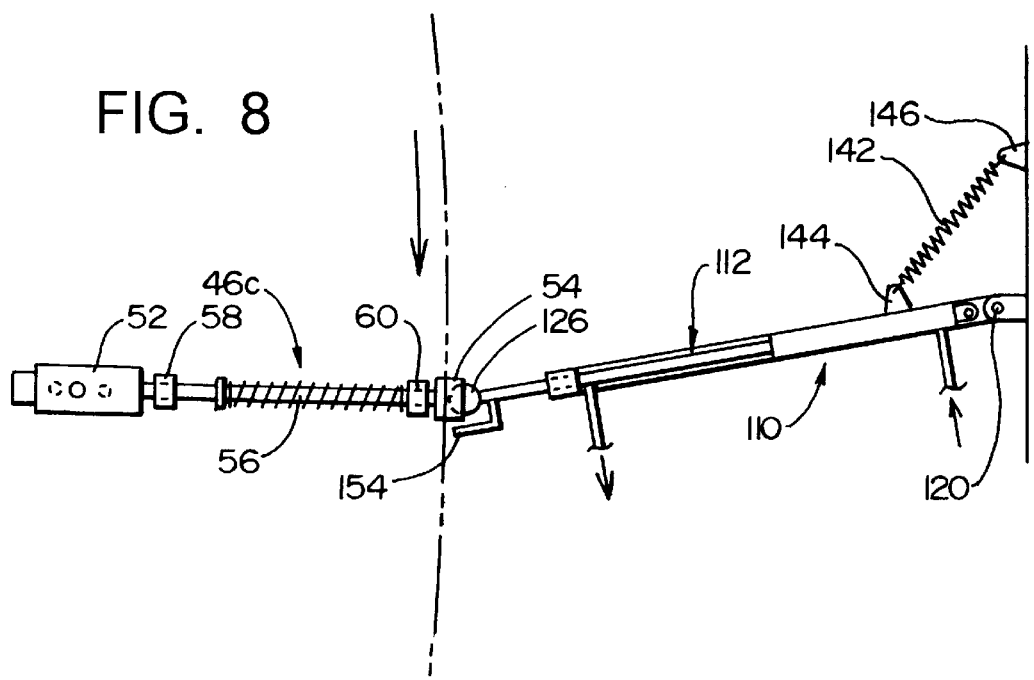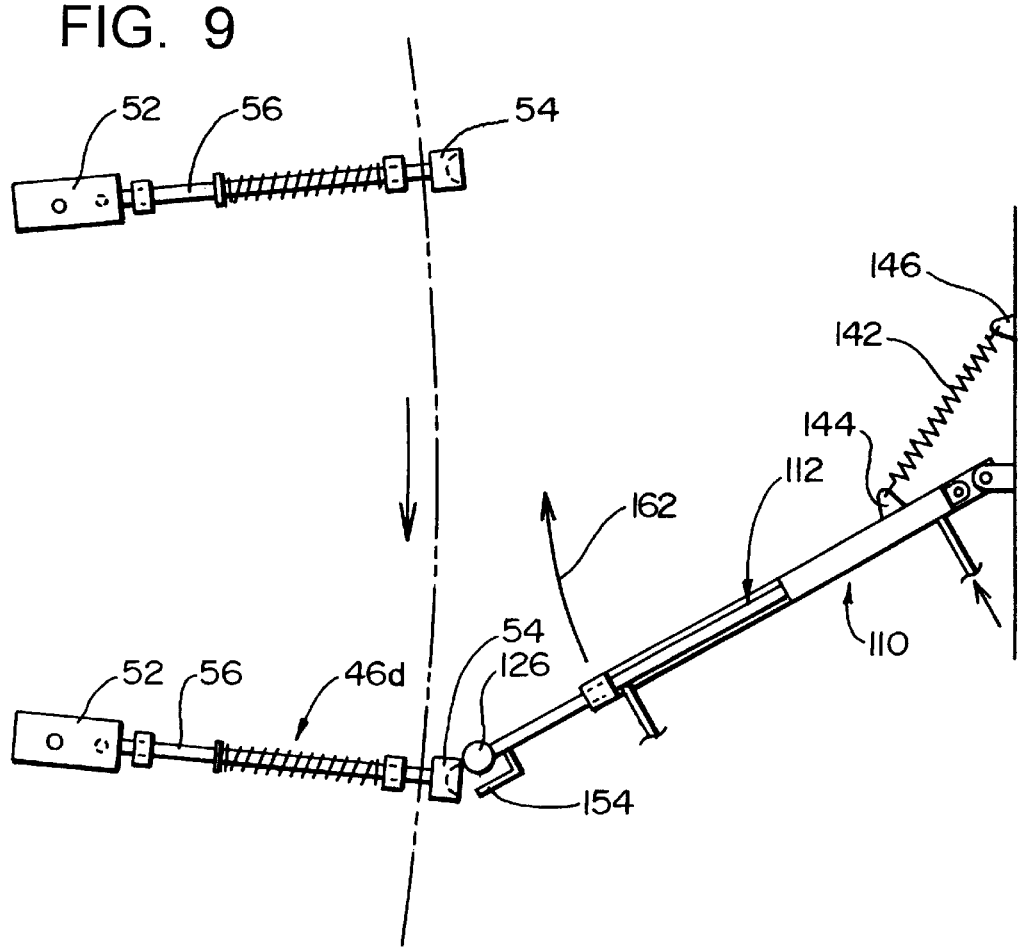

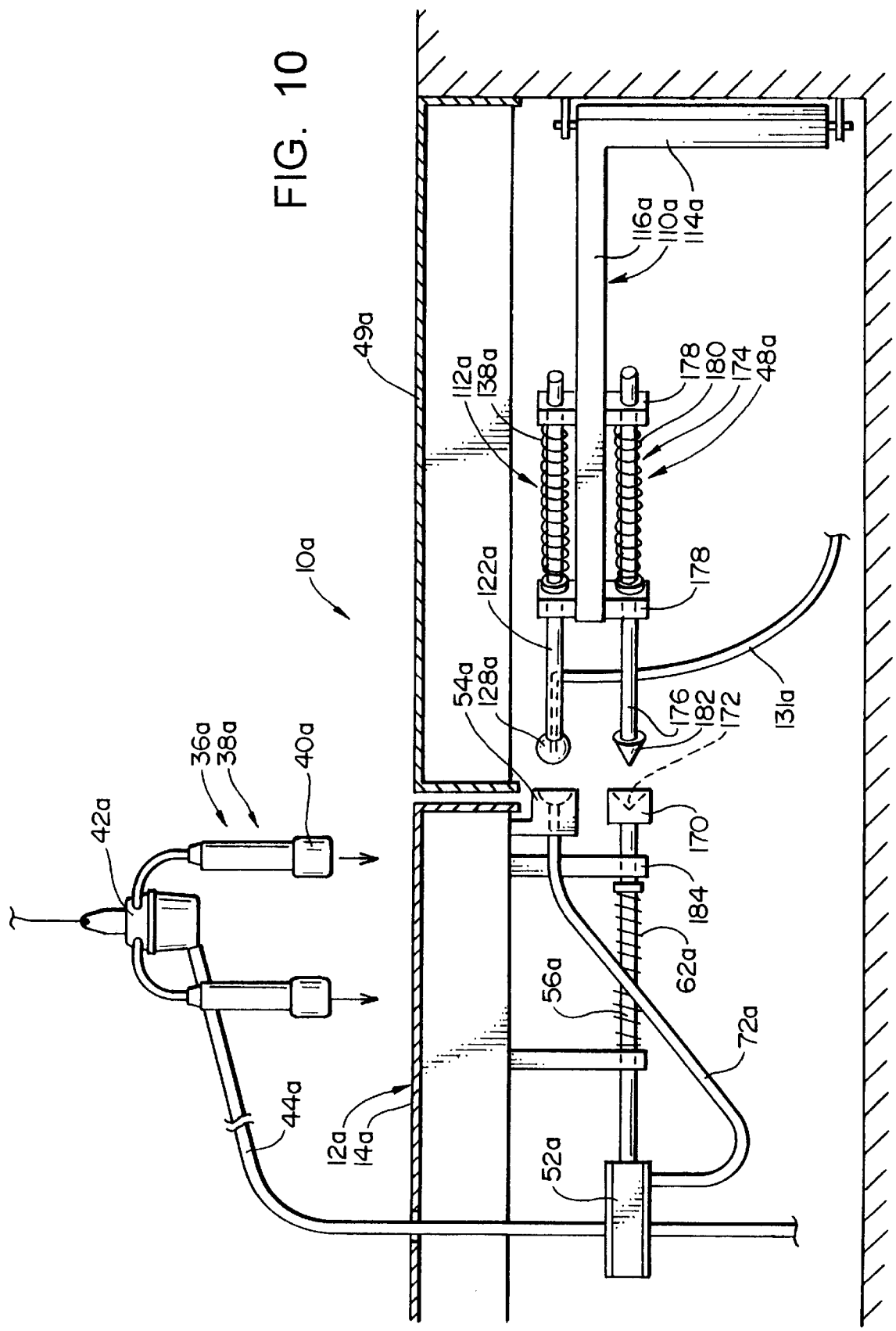

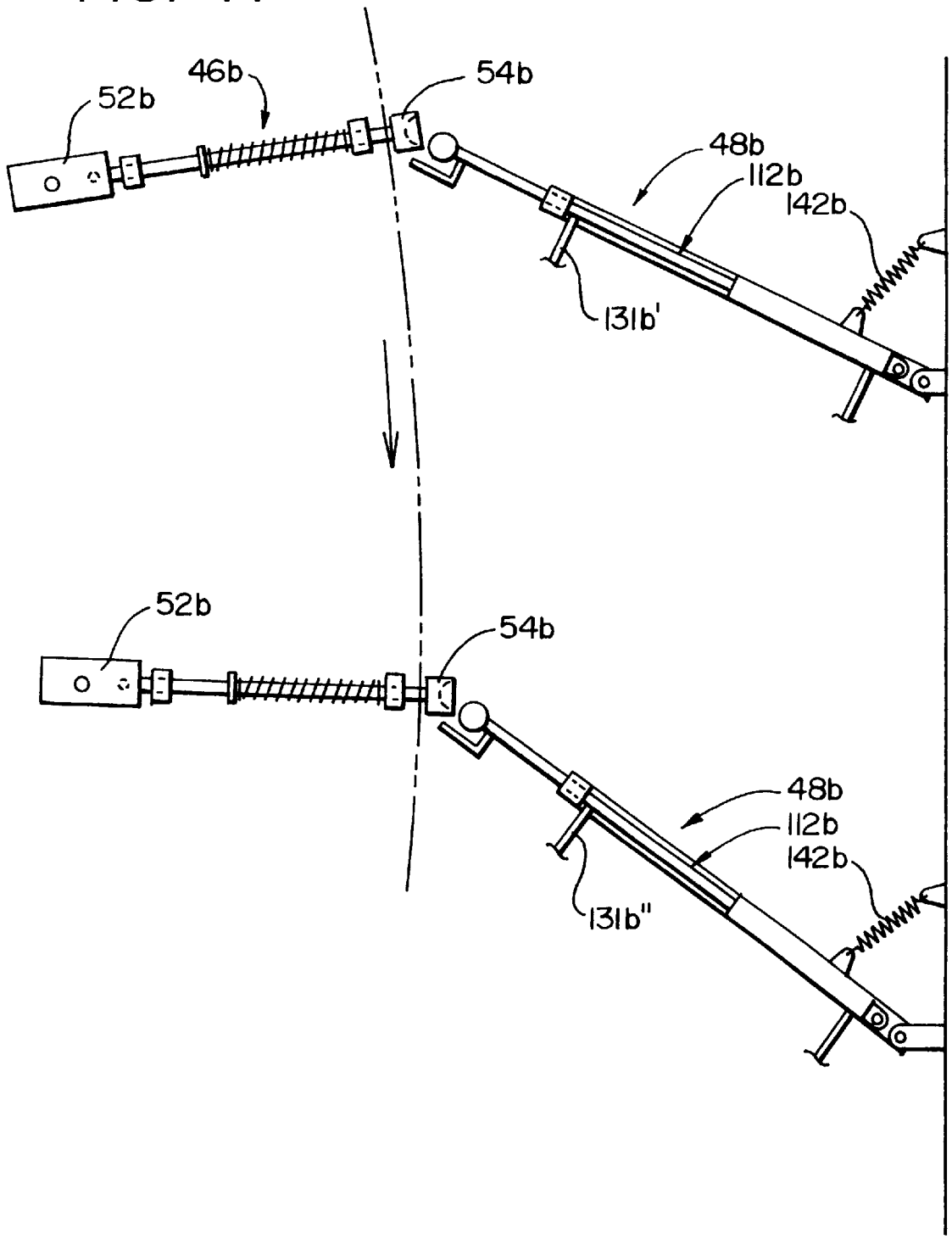

WASH SYSTEM, APPARATUS AND METHOD FOR A ROTARY MILKING APPARATUS

This application claims benefit of Provisional Appl. No. 60/083,561 filed Apr. 29, 1998.

BACKGROUND OF THE INVENTION

FIELD OF THE INVENTION

The present invention relates to wash systems for milking parlors, and more particularly to a system, apparatus and method for a back flush wash system for a carousel or rotary type milking parlor.

The carousel type milking parlor has been in use for a number of years, and it comprises a rotary platform with stalls (milking stations) positioned circumferentially around the rotary platform. There is an entry and exit location where the cows to be milked are individually led into the stalls. At that time the "claws" of the milking machine are attached to their udders, and the milking process begins, with the machine extracting milk from the cows and delivering the milk to a collecting location.

The milking operation continues as each individual cow is carried in a circular path, and the rate of rotation of the platform is gauged so that the milking of each cow is completed before the cow reaches the exit station at the inlet/outlet area. Prior to the time that each cow arrives at the exit station, the milking operation for that cow has been completed, so that an appropriate sensor in the milking apparatus shuts off the suction to the milking apparatus attached to that particular cow. This causes the "claw" to automatically become disengaged from the cow. When that cow reaches the exit area, she is moved off the platform.

For sanitary reasons (i.e. reducing the possibility of a disease being transmitted from one cow to the other), it is not uncommon for milking parlors to be provided with a back flush washing system for the individual milking machines. In a rotary (carousel-type) milking parlor, this is commonly accomplished by installing a wash liquid supply line around the circumference of the rotating platform, and there are individual conduits from this wash liquid supply line leading to a valve positioned in the transfer line at each milking station. Each such valve has a first position where the milk from the cow is directed from the individual milk machine through a milk carrying conduit to a collecting location. When the back flush operation is to take place (after the milking process for that individual cow has been completed and the claw has dropped off from the udder of the cow), the valve switches over to its back flush position where it makes a connection to the wash liquid line to direct the wash liquid through the valve and in a reverse direction through the portion of the transfer line that leads to the claw. The wash liquid can simply be warm water, and in some instances a disinfectant is also directed through the line and through the milk machine, followed by a water rinse.

At the completion of the washing for that individual milk machine, the transfer line and the machine are cleared of the wash liquid, either by blowing air through the wash liquid tube and the related portion of the transfer line, or a suction is applied to draw the remaining wash water back to its source.

In the prior art back flush systems, at every stall, there is provided a back flush valve which in turn is connected to its own timing mechanism, which will cause the control valve to move from its milking position to the back flush position and then back to the milking position at certain times in this cycle. Each milk station is provided with its own valve, and also its own line connected to the main source of wash liquid.

In 1979, U.S. Pat. No. 4,145,992 (Rafaely) issued, this being entitled, "System For Washing Milking Cups In A Rotary Milking Machine". This patent discloses a washing system for a rotary milking parlor where the platform is provided with a plurality of wash liquid inlet devices 22, one for each of the milking stations, with each of these devices connected by a conduit 24 through a control valve 18 which in turn connects to its related milking unit 12.

All of the fluid inlets in the devices are carried by (and rotate with) the platform 2 and are positioned to be engaged by a single nozzle 26 at the entry and exit location. This nozzle 26 is carried by a piston 30 which is movable within a cylinder 32 that is pivotally mounted to a base 33 which is at a fixed location. This nozzle 26 is connected to a conduit 34 which is selectively supplied with water from a central water source, compressed air from a compressed air source, and a sterilizing agent from a sterilizing agent source.

When each of the fluid inlet devices 22 reaches a particular location near the wash liquid discharge nozzle 26, a control mechanism causes the piston 30 in the cylinder 32 to extend outwardly so that the nozzle 26 comes into engagement with the fluid inlet device 22. Then a control mechanism causes the back flush washing cycle to take place.

A typical cycle can be where the wash water is discharged for two seconds, this being followed by an application of compressed air and a sterilizing agent. There is a "dwell" to permit the sterilizing agent to act (for example) for four seconds, after which more wash water is applied, and then compressed air to remove the water from the line. While this is happening, the cylinder and piston assembly 30/32 is moving in an arcuate path about its fixed base 33. When the piston assembly 30–32 reaches a certain location in its arcuate path of travel, it triggers a control member which causes the piston 32 to retract, thus disengaging the nozzle 26 from the fluid inlet device 22. A tension spring 88 attached to the cylinder 32 then pulls the piston/cylinder assembly 30/32 back to its original position as shown in the drawing of U.S. Pat. No. 4,145,992.

The control mechanism for this system comprises a plurality of control members 66 fixedly mounted at regularly spaced intervals to the rotary platform at a pre-determined distance from its related fluid inlet device 22. The control elements 66 sequentially engage a fixedly mounted control member 68 which moves a valve element in the control member 68 to cause a valve element (piston 94) in a fluid control device 72 to move from the position shown in the Figure of this patent to the right. This causes fluid to flow through the line 74 (which is mistakenly identified as 44 in the drawing) to cause the piston 30 to extend to cause the engagement of the nozzle 26 with the fluid inlet device 22 with which it is aligned. Then when the piston/cylinder 30/32 reaches its end limit of angular travel, it engages a further control member 78 which directs fluid to the control valve 72 to cause a valve element 94 to move back to its original position, so that the piston 30 is caused to retract.

The wash cycle is controlled by a timer 48 (not shown in the drawing, but presumably being the rectangle in which the knobs 56, 58 and 60 are located). The timer is triggered by a pressure switch 64 within the chamber 72 of the cylinder 32, this switch 64 sensing when the piston 30 has completed its movement to its projected position, this being sensed by the sudden rise of pressure in the chamber 76, at which time the switch 64 transmit an electrical signal, via the line 62, to the timer 48.

To the best knowledge of the applicant herein, the washing system disclosed in U.S. Pat. No. 4,145,992 has either not been commercially implemented in the dairy industry, or at least has not been widely commercialized in the dairy industry.

U.S. Pat. No. 3,999,517 (Anderson) shows a rotary milking parlor having a plurality of milking units 9, each of which discharges its milk into a related receiving vessel 6. Each of the receiving vessels 6 has a coupling means 10 which comes into engagement with a matching member 3 which is moved by a pneumatic cylinder 4 into and out of engagement with the member 10. This member 3 is in turn mounted to an arm 1 which in turn is pivotally connected to a swing arm 1 mounted at a fixed location.

As the receiving vessel 6 moves along its arcuate path when its coupling member 10 is exactly above the coupling member 3 the coupling member 3 is raised by the pneumatic cylinder 4 to engage a coupling means 10. As the receiving vessel 6 moves further along the arms 1 and 2 move along with it, during which time, the milk is being discharged into the tube 5 and into the container 8.

SUMMARY OF THE INVENTION

The present invention provides a washing system for a rotary milking parlor where there is a rotating structure having a plurality of milking stations, each having a related milking unit. Each milking unit has a milk transfer outlet to deliver milk to a collecting location.

The washing system comprises a washing apparatus comprising a plurality of wash units mounted to the rotating support structure in a circumferentially spaced pattern. Each wash section comprises a wash inlet connecting device positioned to travel in a circumferential path of travel which passes through a washing location.

The washing apparatus also comprises a wash control valve which is operably connected to the outlet of its related milking unit and to its related wash inlet connecting device. The wash control valve has a first position to direct milk from its milking unit toward the collecting location, and a second position to connect its related milking unit to its related wash inlet connecting device.

There is a wash liquid supply section which is positioned at the washing location and which has a nozzle section comprising a support member and a liquid supply nozzle mounted thereto. The nozzle is arranged to come into operating engagement with each of the wash inlet connecting devices to deliver wash liquid into each of said wash inlet connecting devices. The support member and the nozzle are mounted for back and forth travel to carry the liquid supply nozzle along a liquid supply travel path from a first engaging location to an intermediate dispensing path portion of said liquid supply travel path, to a release location along the liquid supply travel path, with the intermediate dispensing path position being proximate to said circumferential path of travel of the wash inlet connecting device.

Each of the wash units and the liquid supply section are arranged to comprise abutment means which comes into operative engagement with each wash inlet connecting device at the engaging location. This causes the nozzle section to move along the liquid supply travel path in timed relationship with each related wash inlet connecting device moving along the circumferential path of travel to cause the liquid supply nozzle to come operating engagement with the wash inlet connecting device. The wash inlet connecting device remains in operating engagement with the nozzle, while traveling through the intermediate dispensing path portion, and coming out of operating engagement when the liquid supply nozzle reaches the release location.

There is valve actuating means to cause each of the control valves to move from its first position to its second position for travel of the wash unit through the intermediate dispensing path portion, and then back to its first position.

In one preferred embodiment, the valve actuating means is responsive to engagement and disengagement of the wash inlet connecting device and the nozzle section.

Also there is wash cycle initiating means which is responsive to each of the wash inlet connecting devices moving to a location proximate to the first engaging location to initiate a wash cycle subsequent to engagement of the wash inlet connecting device coming into initial engagement with the related nozzle section. In the preferred form, the wash cycle initiating means comprises switch means which is engaged by the wash liquid supply section in its movement along the liquid supply path.

Also, in the preferred form, the valve actuating means is responsive to engagement of the wash liquid supply section coming into engagement with the wash inlet connecting device.

The wash liquid path extends from the first engaging location toward the circumferential path of travel of the wash units to cause the valve actuating means to move the control valve from its first position to the second position of the wash control valve.

In the preferred form, the nozzle section is arranged to move along the liquid supply travel path in a generally arcuate path of travel. The valve actuating means is arranged so that back and forth travel is on a path having a substantial radial valve actuating component of travel toward and away the center axis of location of the milking apparatus, and the nozzle section engages the valve actuating means to cause movement along said actuating path.

In the preferred form, the valve actuating means has yielding positioning means to urge the valve actuating means to place the wash control valve in its first position, and the nozzle section has a valve actuating engaging portion to urge the valve actuating means to its second position against the urging of the positioning means.

Also, the valve actuating engaging portion of the nozzle section has a yielding positioning means which acts with a force greater than a force exerted by the yielding positioning means of the valve actuating means, so that when the valve actuating engaging portion engages the valve actuating means, the valve actuating means moves to a second position. Then when the valve actuating means moves the control valve to a second position, the valve actuating engaging portion moves against the urging of the yielding positioning means the valve actuating engaging portion to retract. Upon disengagement of the valve actuating engaging portion with the valve actuating means, the valve actuating means moves to cause a control valve to move to a second position, and the valve actuating engaging portion extends to be at its original position.

In terms of function, the wash liquid supply section can be considered as having in broad terms a liquid dispensing and valve actuating portion which is moveable along the liquid supply path of travel. This liquid dispensing and valve actuating portion performs the function of supplying the wash liquid, and also valve actuation.

In one embodiment, a valve control device is connected to the wash inlet connecting device so that these move as a single unit. In another embodiment, there is a separate valve actuating member which comes into contact with the valve positioning member, and then a nozzle member that comes into the wash inlet connecting device.

In the method of the present invention, an apparatus is provided as described above. As the wash unit is moved into the washing area, the wash inlet protecting devices are positioned so as to be caused to make contact with the related nozzle members, this being accomplished by interacting engaging means, as described above. Then the valve is caused to move to the second position, and the wash liquid is delivered through the system to the wash unit. When the valve unit collecting device is moving out of the engaging position, it comes out of contact with its related nozzle, and the control valve moves back to its original position.

Other features of the present invention will become apparent from the following detailed description.

BRIEF DESCRIPTION OF THE DRAWINGS

FIG. 8 is a top plan view similar to FIGS. 3 and 6, showing the wash apparatus near the completion of a single wash cycle;

FIG. 9 is a view similar to FIG. 8, showing the apparatus at the completion of the wash cycle, where the wash liquid dispensing device is out of engagement and is starting to move angularly back to its original position;

FIG. 10 is a view similar to FIG. 1, but showing a second embodiment of the present invention; and FIG. 11 is a view similar to FIG. 3, but showing a third embodiment of the present invention.

DESCRIPTION OF THE PREFERRED EMBODIMENT

In describing the present invention, there will first be a general description of a typical prior art milking parlor in which the present invention is incorporated, then a general description of the basic components of the present invention and the mode of operation, and finally a more detailed description of these components.

Figure 1:
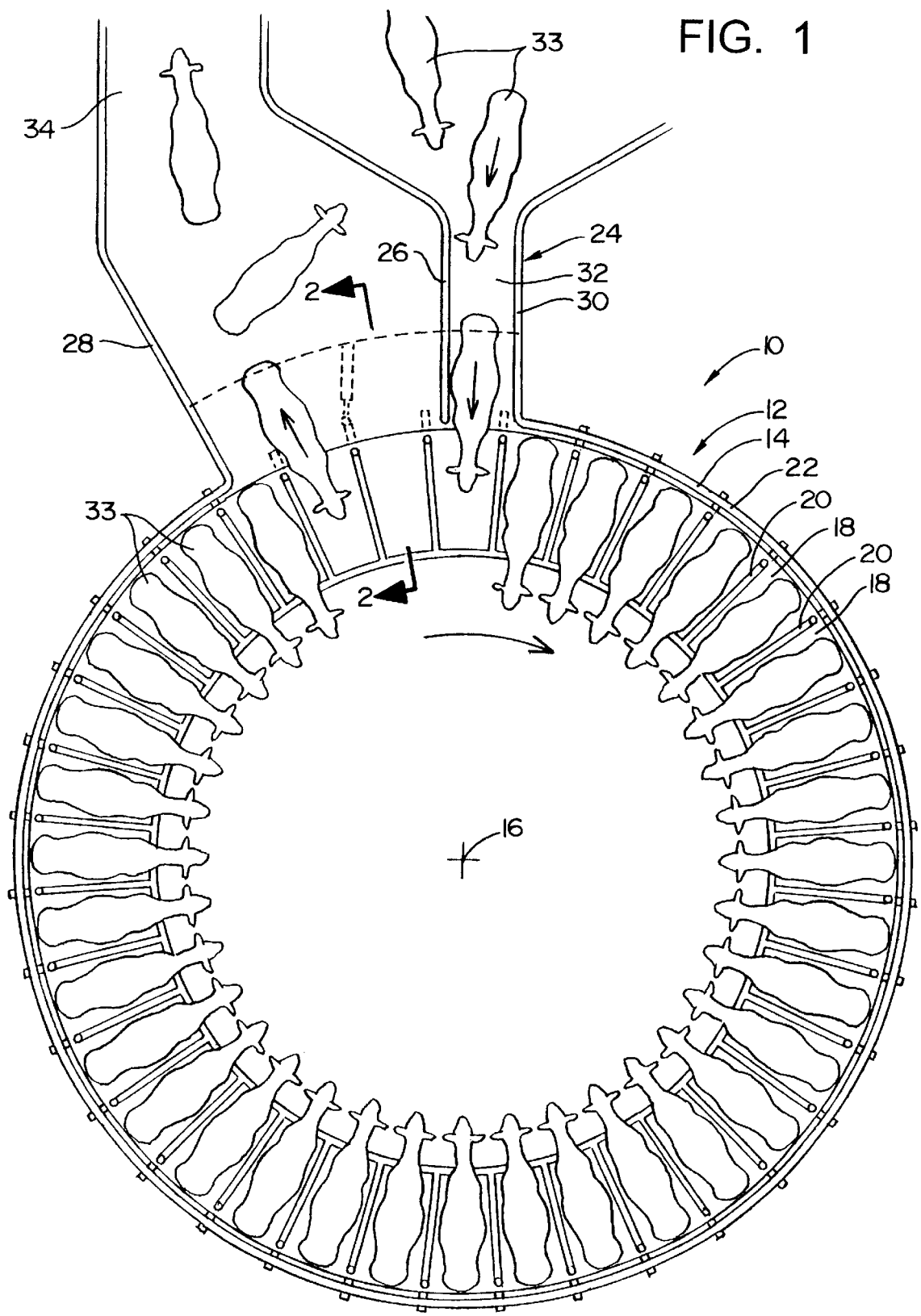
FIG. 1 is a top plan view showing a rotary milking parlor incorporating the present invention.

With reference to FIG. 1, there is shown a rotary milking system 10 in which the present invention is incorporated. This system comprises a main structure 12 that comprises a horizontal circular platform 14, with the structure 12 and its platform 14 rotating about a center axis of rotation 16. There is a plurality of milking stations (stalls) 18 at equally spaced circumferential locations around the platform 14, with these stalls being defined by radially extending partitions 20.

A station enclosing fence or rail 22 extends substantially entirely around the platform 14. At the perimeter of the platform there is an entry/exit area 24 is provided with an entry portion 24 defined by a middle rail 26 and two outside rails 28 and 30, with the rails 26,28 and 30 defining a radially aligned entryway 32 for the cows 33, and the rails 28 and 26 defining an exit area 34.

Figure 2:
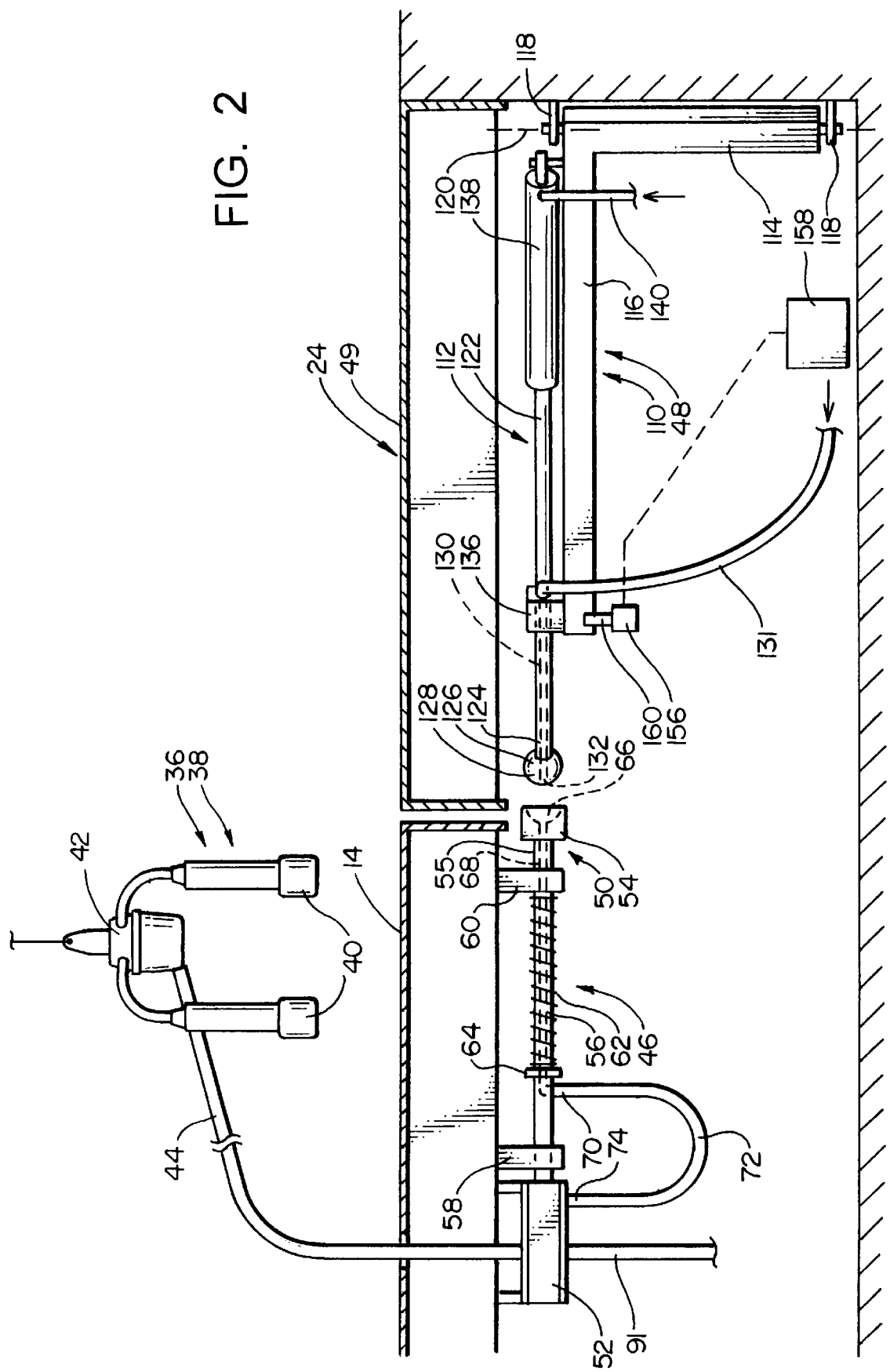
FIG. 2 is a sectional view taken along line 2—2, illustrating the main components of the present invention'.

With reference to FIG. 2, for each milking station 18, there is a related milking machine 36 that comprises a claw 38 that in turn has a plurality of cups 40. The cups 40 are in turn connected to a housing 42 that defines a collecting chamber that in turn connects to a milk transfer line section 44.

The components which have been described thus far are in the prior art and would commonly be present in the prior art rotary milking parlor. There will now be a description of the main components of the present invention, and also the basic operation of these.

Reference is again made to FIG. 2 where there are shown the two main components of the present invention. First, there is a plurality of individual wash units 46 which are mounted below the platform 14 near the circumference thereof, with each of these units 46 being positioned adjacent to a related milking station 18. Second, there is a single stationary wash liquid supply unit 48 which is mounted beneath the stationary platform 49 that forms the floor for the entry/exit area 24. In operation, each of the individual wash units 46 travels on a circumferential path by the wash liquid supply unit 48 to make a connection therewith to receive the wash liquid from the supply unit 48.

To describe the individual wash units 46 in more detail, each wash unit 46 comprises a wash inlet connecting device 50 and a control valve 52. The wash inlet connecting device functions to make a fluid connection with the supply unit 48 to receive the wash liquid 48 and transmit this liquid through the valve 52 to accomplish the back wash operation. In addition to supplying the liquid, the supply unit 48 also functions to move the control valve 52 from its first position where it delivers milk from the related milking machine 36 to a second wash position where it transmits wash liquid through the milking machine 36.

The connecting device 50 for each wash unit 46 comprises a wash inlet connecting member 54 that is connected to the radially outward end 55 of a rod 56. This rod 56 is mounted for back and forth motion by means of two radially spaced mounting brackets 58 and 60.

A tension spring 62 is mounted around the rod 56, with the radially outward end of the spring 62 connecting to the radially outward mounting bracket 60, and the radially inward end of the spring 62 connecting a collar 64 fixedly connected to the rod 56. Thus, the spring 62 urges the rod 56 and the connecting device 54 in a radially outward direction.

The aforementioned connecting device 54 is formed as a receptacle and has a radially outwardly facing recess 66 which in this preferred configuration is spherically curved. This recess 66 connects to a central passageway 68 formed in the radially outward portion of the rod 56. The radially inward end of the passageway 68 connects to the inlet end 70 of a tube or conduit 72, the outlet end 74 of which is connected to the control valve 52.

Figure 4:
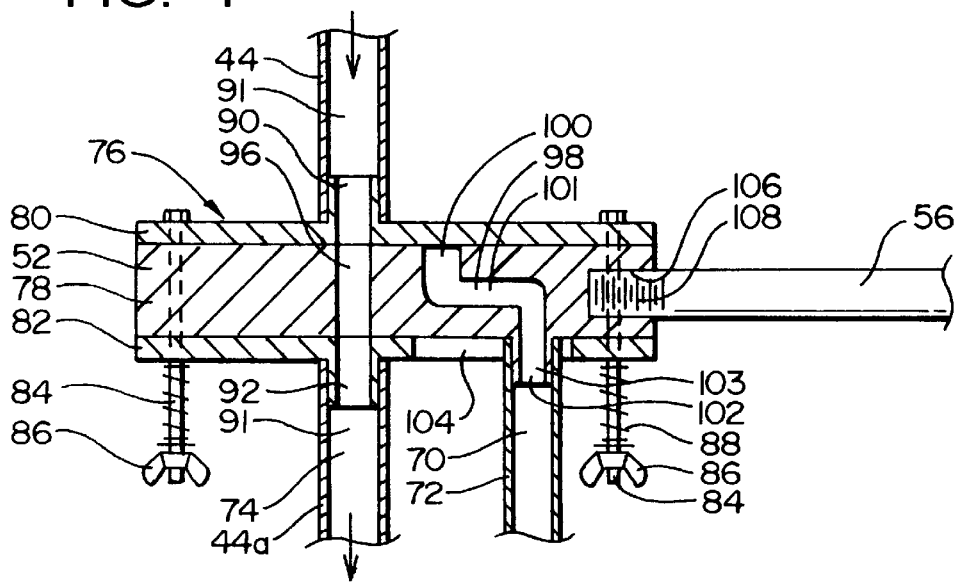
FIG. 4 is a sectional view taken along line 4—4 of FIG. 3 showing the wash control valve in its milk collecting position.
Figure 5:
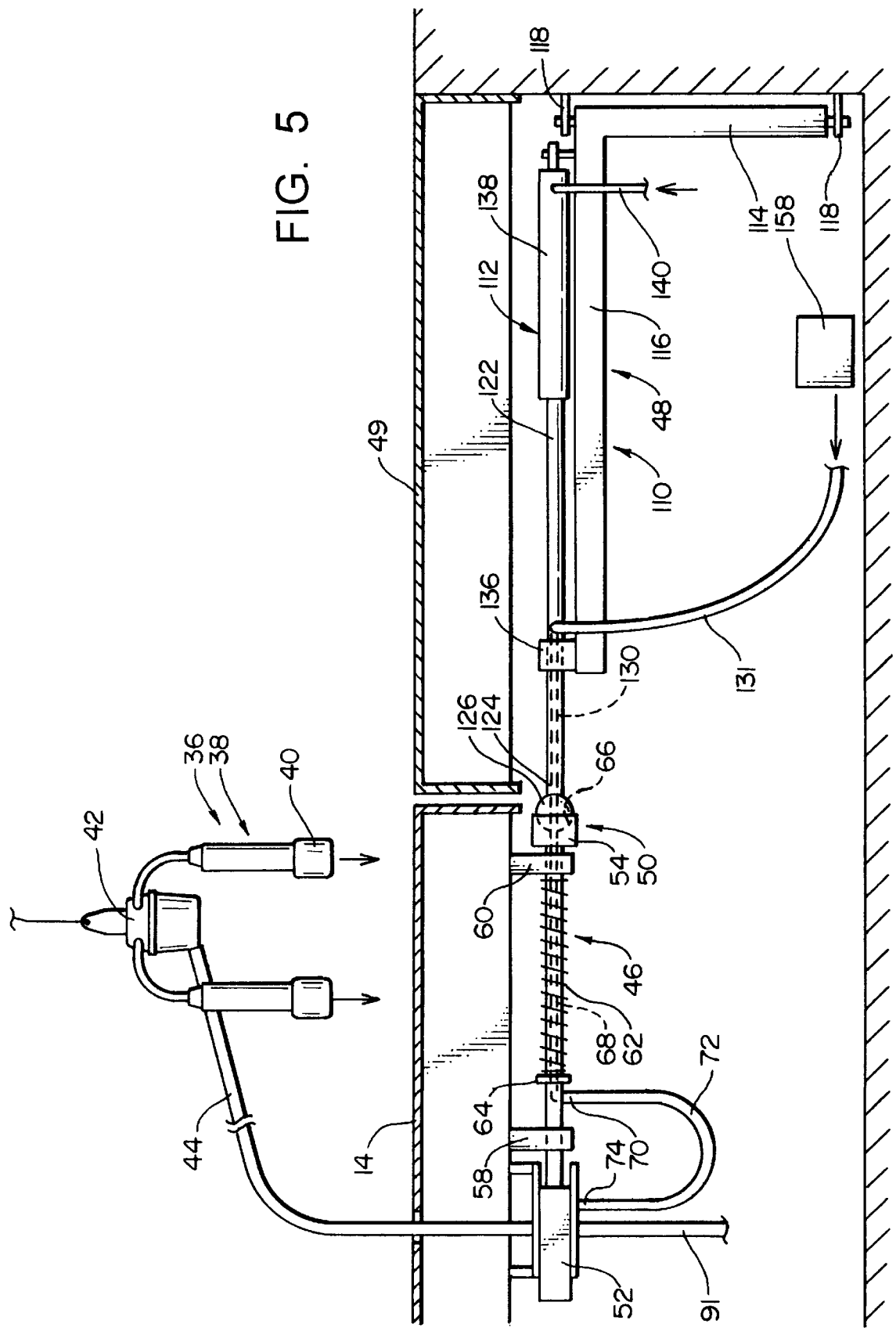
FIG. 5 is a view, similar to FIG. 2, showing the apparatus in a position where the wash inlet connecting device is in operating engagement with the wash liquid dispensing device.
Figure 7:
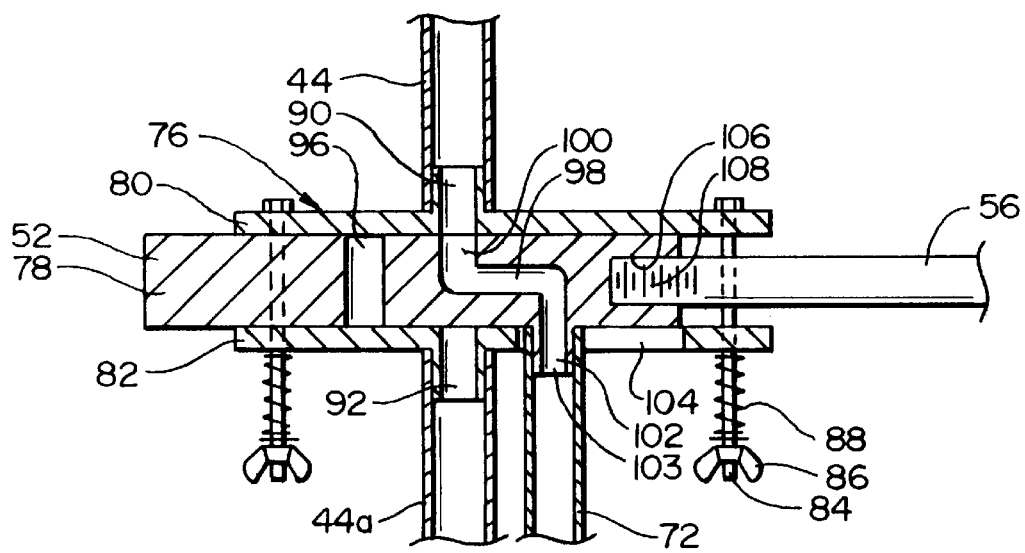
FIG. 7 is a cross-sectional view, similar to FIG. 4, showing the wash control valve of a particular unit in its wash position.

One of the control valves 52 is shown in cross-section in its first position (a milk transmitting position) in FIG. 4, and in a second position (the wash position) in FIG. 7. Each of the control valves 52 comprises a housing 76 and a valve element 78. The housing 76 is made up of two parallel rectangular plates 80 and 82 spaced from one another, with the valve element 78 being positioned between the plates 80 and 82.

The plates are interconnected by a plurality of bolts 84 (two of which are shown in FIGS. 4 and 7). These bolts 84 are located adjacent to the four corners of the two plates 80 and 82, and each bolt 84 is provided with a related wing nut 86. Each wing nut 86 presses against a related compression spring 88 surrounding the shank of the bolt 84 and pressing against the plate 82. Thus, the valve element 78 is sandwiched between the two plates 80 and 82, with the force of the springs 88 urging the two plates 80 and 82 toward one another. The wing nuts 86 can be adjusted so that the plates 80 and 82 exert the proper amount of balanced force against the valve element 78.

The plate 80 is formed with a single connecting stub 90 which is attached to the outlet end of the milk transfer tube section 91 which fits around the stub 90. The other plate 82 has a stub 92 which connects to a second milk transfer tube section 91, the second section 91 leading to the milk collecting location.

The aforementioned valve element 78 is desirably made as a rectangular block of a rigid plastic material. This block 78 is formed with two through passageways. One of these is a milk transfer passageway 96 which (in the first position of the valve element 78) is aligned between the two connecting stubs 90 and 92 so that the milk flows through the first milk delivery tube section 44, thence through the passageway 96 and through the second tube section 91. (This is the position shown in FIG. 4).

The valve element 74 is also formed with a wash liquid passageway 98 that has a first end portion 100 which is positioned adjacent to the plate 80. This passageway 98 has a longitudinal middle portion 101, and a second end 102 which leads to a cylindrical connecting stub 103 that is connected to, and extends outwardly from, the side of the valve element adjacent to the plate 82. This connecting stub 103 connects to the outlet end 74 of the wash liquid transfer tube 72. The plate 82 is formed with a radially aligned slot 104 to permit the movement of the connecting stub 102 in the back and forth movement of the valve element 78.

With reference to FIG. 7, when the valve element 78 is moved to its second position of FIG. 7, the wash liquid passageway 98 is positioned so that its one end 100 is aligned with the connecting stub 90, so that the first section 44 of the milk transfer conduit has a fluid connection through the passageway 98 to the wash liquid tube 72. In the second position of FIG. 7, the valve element 78 is positioned so that the milk transfer passageway 96 of the valve element 78 is out of alignment with the connecting stubs 90 and 92 to block any flow between the milk transfer conduits 44 and 91.

The radially outward end of the valve element 78 is formed with a socket 106 to receive the radially inward end 108 of the rod 62. The rod end 108 is formed with threads to match with threads in the socket 106 to securely connect the rod 62 to the valve element 78. Thus, when the rod 56 is pushed radially inwardly by the wash liquid supply unit 48, the valve element 78 is moved from the first milk transfer position of FIG. 4 to the second wash position at FIG. 7. Then when the wash inlet connecting device 50 becomes disengaged from the wash liquid supply unit 48, the tension spring 62 pulls the wash inlet connecting device 50 radially outwardly to move the valve element 78 back to the milk transfer position of FIG. 4.

To describe now the aforementioned wash liquid supply unit 48, as indicated previously, this is a single wash liquid supply unit 48 which is at a stationary location adjacent to the entry/exit area 24. Also (as indicated previously), this supply unit 50 performs two primary functions. First, it makes a liquid connection with each of the wash units 46 sequentially to supply the wash liquid. Second, it functions as a control valve actuator to engage the wash liquid connecting device 54 to move the valve element 78 of the control valve 52 to its wash position of FIG. 7.

With reference to FIG. 2, this supply unit 48 comprises a support member 110 and a liquid dispensing and valve actuating assembly 112. The support member 110 comprises a vertical support post 114, the upper end of which is connected to a horizontally extending support arm 116. The post 114 is swing mounted to upper and lower mounting brackets 118 to enable the post 114 to rotate about a vertical pivot axis 120.

The liquid dispensing and valve actuating assembly 112 comprises a horizontal rod 122 mounted to the arm 116. This rod 122 has a delivery end 124 where there is located a nozzle 126 shaped as a spherical member or ball 128. The outer end of the rod 122 is formed with a passageway 130 that connects at one end to a wash liquid supply tube 131 and leads to a discharge opening 132 in the nozzle 126. The rod 122 is slide mounted for back and forth motion by a mounting block 136 at the outer end of the support arm 116, and supported at its pivot end by an air cylinder 138 which is supplied with pressurized air at its pivot end by a air tube 140. The rod 122 extends into the air cylinder 138, and the rod 122 has in its inner end a piston (not shown) located in the cylinder 138, and the pressurized air in the cylinder 138 urges the rod 122 to its furthest outward position. The piston within the cylinder 138 limits the outward travel of the rod 122, and the normal pre-operating position of the rod 22 is that it is extended.

Figure 3:
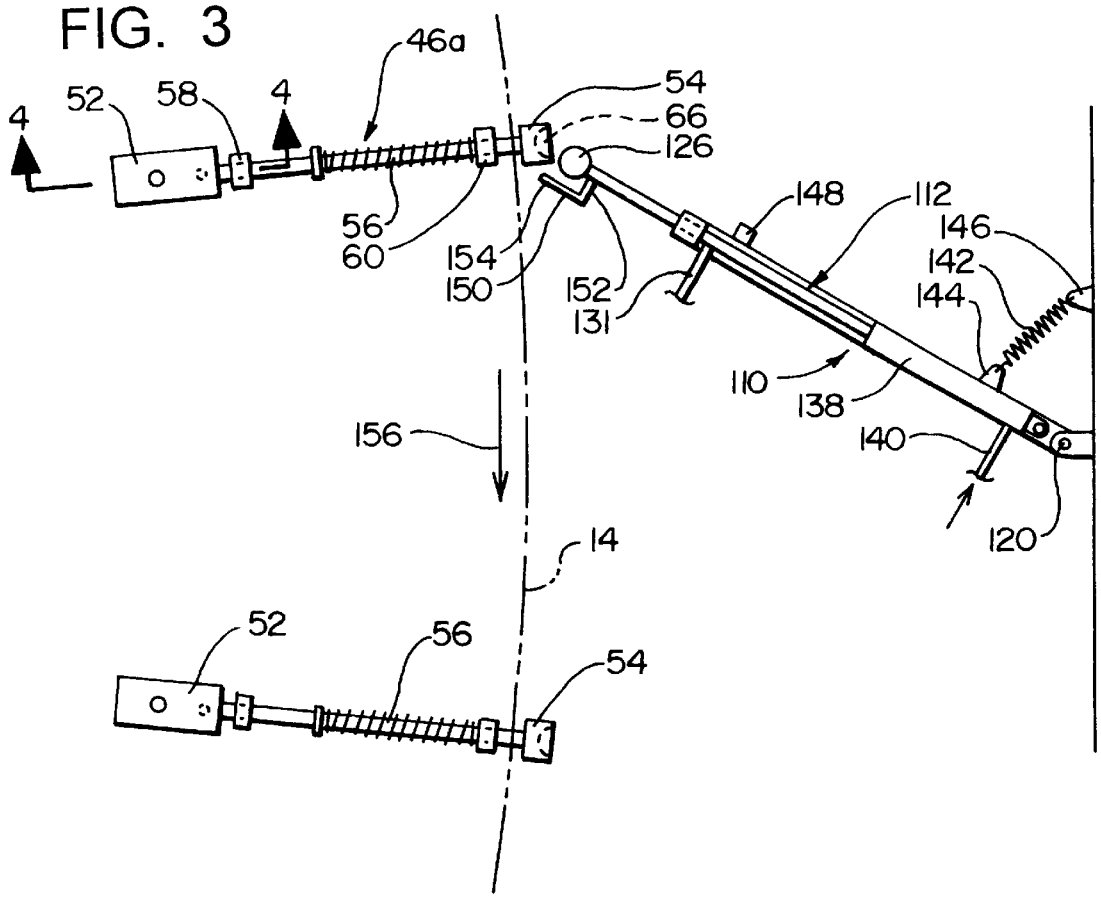
FIG. 3 is a top plan view of a portion of the apparatus shown in FIG. 2, illustrating one of the wash inlet connecting devices coming into engagement with the wash liquid dispensing device.

To further describe the wash liquid supply unit 48, reference is now made to FIG. 3 where the support member 110 and the assembly 112 are located at their normal pre-operating position. It will be noted that there is a tension spring 142 connected between a first bracket 144 connected to the support arm 116 a moderate distance away from the axis of rotation 118 and to a second bracket 146 attached to stationary structure, also a moderate distance from the pivot axis 118. This spring 142 urges the arm 116 and the assembly 112 clockwise, and there is a locating post 148 which engages the support arm 116 to limit the clockwise rotation and properly position the arm 116 with the assembly 112 in the appropriate pre-operating position.

At the outer end of the rod 122, there is a positioning finger 150 having a laterally extending portion 152 and an outwardly extending engaging finger portion 154 adjacent to the ball shaped nozzle member 126. This positioning finger portion 154 is engaged by the wash inlet interconnecting device 54 as the platform 14 rotates, so that the nozzle member 126 becomes properly positioned with the socket 66 of the connecting device 54 so that the nozzle member 126 properly engages the connecting device 54 to form a fluid seal and interconnect the nozzle opening 132 with the passageway 68 in the rod 56.

In FIG. 2, there is shown schematically a wash initiating switch 156 which is operatively connected to a wash/disinfectant control apparatus shown schematically at 158. This switch 156 has an actuating finger 160 which is positioned to be engaged by the support arm 116. This same switch is shown at 156 in FIG. 6. The contact of the arm 116 with this actuating finger 160 starts the wash/disinfecting cycle.

To describe the operation of the present invention, reference will be made primarily to FIGS. 3, 6, 8 and 9 which show the components in four sequential positions in the operation. As indicated previously, in the overall operation of the rotary milking system 10, the structure 12 with its platform 14 rotates continuously throughout the entire milking period. Each cow 33 enters through the entry way 32 to be positioned in one of the milking stations 18. The milking machine 36 is attached to each cow 33; the milking is accomplished as the platform 14 rotates to carry the cow 33 slowly in a circumferential path; and the milking machine 36 drops free of the cow when the milking is completed (i.e. before the cow 33 reaches the exit location 34).

The wash liquid supply unit 48 is located beneath the platform 49 of the entry/exit area 24, and each of the individual wash units 46, when reaching the wash location, come into operating engagement with the supply unit 48. As can be seen in FIG. 3, the platform 14 is rotating in a clockwise direction, as indicated by the arrow 156.

For convenience of description, the travel of one of the individual wash units 46 through the washing zone will be described at four different operating locations shown in FIGS. 3, 6, 8 and 9. For ease of description, the wash unit 46 at the location in FIG. 3 will be given the designation 46a; this same wash unit in the location of FIG. 6 will be designated 46b; the same wash unit in the location of FIG. 8 will be designated 46c; and finally as this wash unit reaches the release location of FIG. 9, it will be given the designation 46d.

In the position of FIG. 3, the wash unit at 46a is positioned so that its connecting device 56 is about to engage the outer end of the positioning finger portion 154. As soon as the engagement occurs, the support member 110 and the actuating and supply mechanism 112 (mounted thereto) begin rotating about the pivot axis 120, and the nozzle 126 begins traveling an arcuate path about the axis of rotation 120. This arcuate path of travel by the nozzle member 126 thus causes it to move radially inwardly relative to the axis rotation 16 of the rotating platform 14, thus causing the member 126 to enter into the recess 66 of the connecting member 54.

The air pressure in the air cylinder 138 is at a sufficiently high level so that the force which this air cylinder 138 exerts on the rod 122 is greater than the force exerted by the tension spring 162 which acts to position the connecting device 54 in its outward position. Accordingly, as the nozzle 126 engages the connecting device 54, the nozzle member 126 pushes the connecting member 54 radially inwardly to cause the rod 56 to move the valve element 78 from the position of FIG. 4 to the position of FIG. 7 where the milk transfer passageway 96 of the valve element 78 is isolated from the milk transfer tubes 44 and 44a. Since the pressure in the air cylinder 138 is maintained constant, the force to extend the rod 122 remains the same, thus insuring that there is a proper fluid seal made between the nozzle member 126 and the connecting device 54. At the same time, the inlet 100 of the wash liquid passageway 98 comes into communication with the milk transfer tube section 44. In this position, the washing operation is able to begin.

This washing process is initiated by the support arm 116 engaging the actuating finger of the switch 156. The wash cycle can proceed in a manner similar to the washing cycles already practiced in the prior art. One relatively simple washing method is to direct a quantity of hot water through the liquid supply tube 123 to pass through the apparatus and into the milk machine 36. After a sufficient quantity of water has passed through the milk machine 36, then suction could be applied to the tube 132 to draw the remaining water out of the milking machine 36 and also out of the milk transfer line section 44. Alternatively, one of these cycles such as outlined in U.S. Pat. No. 4,145,992 could be utilized. Thus the washing control apparatus 158 would be provided with the proper valving and timing system to accomplish the washing.

Figure 6:
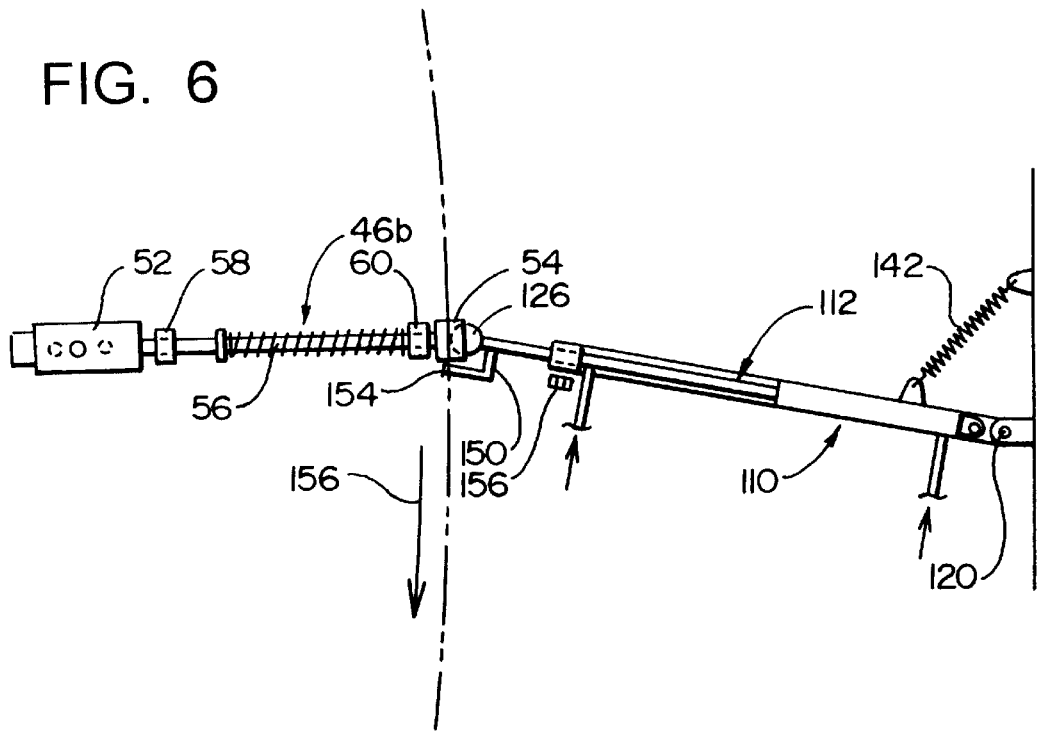
FIG. 6 is a top plan view, similar to FIG. 3, with the wash inlet connecting device in engagement with the wash liquid dispensing device, as shown in FIG. 5.

It can be seen that in the location of FIG. 6 that the connecting device 56 is fully depressed, and that the rod 122 has been pushed inwardly a short distance against the urging of the air spring 138. When the platform 14 reaches the position of FIG. 8, the support arm 110 and mechanism 112 have moved beyond the position where the rod 56 is aligned with the rod 122, so that the arcuate path of the support 110 and the mechanism 112 is moving away from the center of rotation 16 of the platform 14. At the same time, the air cylinder 138 (continuing to push with a force greater than exerted by the tension spring 62) continues to push the nozzle member 126 to cause it to remain in secure engagement with the connecting member 54.

As the platform 14 continues to travel in a clockwise direction from the position of FIG. 8 to the position of FIG. 9, the rod 122 of the supply unit 48 becomes fully extended, and shortly thereafter the rod 56 extends to move the valve element 78. Thus during the travel of the liquid supply unit 48 from the position of FIG. 8, the rod 56 remains in its retracted position so as to maintain the control valve 52 in its wash position of FIG. 7. It is only near the end of travel of the wash liquid supply unit 48 when the rod 122 becomes fully extended that the connecting device 54 begins to move outwardly, thus moving the valve element 78 of the control valve 52 back to its milk transfer position of FIG. 4.

In the position of FIG. 9, the nozzle 126 has just come out of engagement with the connecting device 54. As indicated by the arrow 162, the support arm 110 and the actuating and supply mechanism 112 swing back to the position of FIG. 3 so that the arm 116 comes into contact with the positioning post 148. Then the cycle repeats itself as described above.

FIG. 10 shows a second embodiment of the present invention. Components of this second embodiment which are similar to corresponding components of the first embodiment will be given like numerical designations, with an "a" suffix being added to the numerical designation of the components of the second embodiment.

The rotary milking system 10 of FIG. 10 has, as in the first embodiment, a main structure 12a that comprises a circular platform 14a. Also, there is a plurality of milking stations each having a related milking machine 36a with the claw 38a that in turn comprises a plurality of cups 40a. There is the milk transfer line section 44a leading to the valve 52a.

The components described thus far in connection with the second embodiment are substantially the same as their corresponding components in the first embodiment. Most or all of the components which will now be described for this second embodiment may have some similarity to like components in the second embodiment, but may differ in either structure or function.

In the second embodiment, each milking station has a wash inlet connecting member or device 54a which is mounted at a fixed location to the structure 12a. Further, the connecting line 72a leads directly from the wash inlet connecting device 54a to the valve 52a.

To cause the valve 52a to move between its first and second position, there is provided a valve actuating rod 56a which is urged by a compression spring 62a radially outwardly to its first position, as shown in FIG. 10. At the radially outward end of the rod 56a there is a valve actuating engaging member 170, having a tapered socket 172.

The wash liquid supply unit 48a comprises a support member 110a and a liquid dispensing and valve actuating assembly 112a. As in the first embodiment, the support member 110a comprises a vertical support post 114a and a horizontally extending support arm 116a. There is a horizontal rod 122a, but in this second embodiment this rod 122a serves only to deliver the wash liquid through an need nozzle member 128a to the wash inlet connecting device 54a. In this instance, the nozzle 128a is urged to its outer position by means of a compression spring 138a which serves a function similar to the air cylinder 138a of the first embodiment. There is a liquid supply hose 131a which leads upwardly to connect to a passageway in the rod 122a to direct to the liquid to nozzle 128a.

To actuate the valve positioning member (i.e. the rod 56a) there is provided a valve actuating device 174. This valve actuating device 174 comprises a rod 176 slide mounted in a pair of support blocks 178 and having a compression spring 180 to urge the rod 176 to its outermost position. At the outer end of the rod 176, there is a contact member 180 which fits into the socket 172 of the engaging member 170.

The mode of operation of this second embodiment is basically similar to that of the first embodiment. The support member 110a and the liquid dispensing and valve actuating assembly 112 are mounted for arcuate movement about a vertical axis and move from a first engaging position through an intermediate dispensing path portion to the release location. The function of the liquid supply rod 122a is somewhat different from the corresponding component 122 of the first embodiment in that this rod 122a simply positions the nozzle 128a in its connecting position relative to the wash inlet connecting device 54a. As the liquid supply section 48a rotates along the intermediate path portion, the wash inlet connecting device 54a presses against the nozzle 128a to cause the rod member 122a to retract against the urging of the compression spring 138a. With this arrangement, there is no need for a positioning spring on the wash inlet connecting device 54a.

The control actuating rod 176 engages the contact member 170 at the engaging location to push the contact 170 radially inwardly against the urging of the spring 62a, thus moving the valve 52a to its second position where wash liquid can flow through the valve 52a to the milking unit 36a. When the contact member 170 comes into contact with its related mounting block 184, the valve 52a is in its second position. With there being no further movement of the liquid dispensing and valve actuating assembly 112a, the compression spring 180 permits the contact member 182 to be pushed radially inwardly relative to the axis of rotation of the support member 110a so that contact is maintained between the member 182 and the contact member 170. When the liquid dispensing and valuing actuating assembly 112a moves to release location, the nozzle member 128a comes out of engagement with the wash inlet connecting device 54e, and the contact member 182 retracts from its position in engaging the contact member 170 to permit the valving 52a to return to its first position.

FIG. 11 shows a third embodiment of the present invention. Components of this third embodiment which are similar to components of the first two embodiments will be given numerical designations the same as the corresponding components of the first and second embodiment, with "b" suffix distinguishing those of this third embodiment.

The third embodiment is substantially the same as the first embodiment, except that there are two liquid supply units 48b, which are substantially identical to the supply unit 48 of the first embodiment. The first liquid supply unit 48b shown in the upper part of FIG. 11 has the wash liquid supply tube 131b', which supplies the wash and/or rinse liquid to the wash inlet connecting device 54b.

Then the second wash liquid supply device 48b has a similar tube 131b", which has the function of either blowing out the wash liquid or drawing the wash liquid back into the tube 131b'. In other respects, the overall operation remains substantially the same as in the first embodiment.

Thus, in operation, when each wash unit 46b arrives at the first washing location, it comes into engagement with the first liquid dispensing and valve actuating assembly 112b. Then each wash unit 46 arrives at the second washing location, and the liquid dispensing and valve actuating assembly 112b at the second location either withdraws the wash liquid or discharges it through the milking unit.

It is to be understood that the description given in this text describes the presently preferred embodiment of the present invention mostly in terms directly related to this embodiment. It is to be further understood, of course, that this terminology is not intended to limit the scope of this invention to the specific components as shown and combinations of such components that comprise this embodiment. For example, in the text of this application certain elements are recited, such terms as:

"Stationary platform 49, control valve 52, connecting member 54, rod 56, brackets 58 and 60, spring 62, tube 72, valve element 78, plates 80 and 82, support member 110, actuating rod assembly 112, post 114, arm 116, bracket 118, nozzle 126, air cylinder 138, tension spring 142, etc.

It is quite evident that a person of ordinary skill in the art, and/or a person of ordinary mechanical skill in general, could find various mechanical, electric, electromagnetic, magnetic or hydraulic devices of a wide variety which could perform similar functions in the present invention, while still being within the broad overall combination and subcombinations of the present invention. As an example (which is one of many specific examples which could be given), in FIG. 2 there is shown a wash initiating switch 156 having an actuating finger 160 which, in response to the movement of the arm 115 initiates the wash/disinfectant cycle which is implemented by the wash/disinfectant control apparatus 158. It is evident that while this switch 156 has proven to be an effective means of accomplishing this function, within the broader scope of the present invention, a wide variety of mechanisms could be used to perform the functions of this switch 156, and that initiating the washing cycle at a certain stage in the overall cycle could be accomplished in a wide variety of ways. For example, there could be an optical sensor, a proximity sensing device, a pressure responsive device, a computer initiated signal and any other number of devices or schemes which could be devised to initiate this wash/disinfectant cycle. Thus, if components or combination of components are described in the appending claims in terms of a means plus function, or in terms of the element or combination of elements themselves in broad terms, it is to be understood that these are to be given the proper scope of interpretation so that the claims would be intended to include other devices which may be structurally different or have additional functions, but still perform the broad function stated or intended, either as a "means plus function" recitation, or by equivalency.

The above examples discussing the scope of interpretation to be given to these comonents is not of itself intended to be limited to those particular items mentioned, and there has not been a recitation of further edamples simply to avoid making an unduly long pseification. Rather, the spirit in which these components are recited and the interpretation which should be given are givenhere by wy of example, and intended to be applied to the other various components and combination of comonetns as described in this text.

Also, it is to be understood that the positioning of the components could be modified. Further the dispensing nozzle 128 need not be a "nozzle" in the traditional sense, but some mechanism capable of accomplishing the liquid transfer operation. It is further to be understood that the above examples discussing the scope of interpretation to be given to these components is not of itself intended to be limited to those particular items mentioned, and there has not been a recitation of further examples simply to avoid making an unduly long specification. Rather, the spirit in which these components are recited and the interpretation which should be given are given here by way of example, and intended to be applied to the other various components and combination of components as described in this text.

In some instances, certain components or combination of components recited in the claims cooperate in a particularly advantageous manner to uniquely accomplish some of the functions of the present invention and thus some of the more limited claims would be limited by that specificity of language. However, this more limited interpretation is not to be used to interpret the broader claims that narrowly.

It is to be recognized that various modifications could be made to the present invention without departing from the basic teachings thereof.

What is claimed is:

1. In combination a washing system and a rotary milking apparatus, said apparatus comprising a rotating support structure having a plurality of milking stations and a plurality of milking units located at respective milking stations, each milking unit having a milk transfer outlet to deliver milk to a collecting location, said washing system comprising:
   a. a wash apparatus comprising a plurality of wash units mounted to said rotating support structure in a circumferentially spaced pattern, each wash unit comprising:
      i. a washing inlet connecting device positioned to travel in a circumferential path of travel which passes through a washing location;
      ii. a wash control valve which is operatively connected to the outlet of its related milking unit and to its related wash inlet connecting device, said wash control valve having a first position to direct milk from its milking unit toward the collecting location and a second position to connect its related milking unit to its related wash inlet connecting device;
   b. a wash liquid supply section which is positioned at said washing location and which has a nozzle section comprising a support member and a liquid supply nozzle mounted thereto, said nozzle being arranged to come into operating engagement with each of said wash inlet connecting devices to deliver wash liquid into each of said wash inlet connecting devices, said nozzle section being mounted for back and forth travel to carry said liquid supply nozzle along a liquid supply travel path from a first engaging location, through an intermediate dispensing path portion of said liquid supply travel path, to a release location along said liquid supply travel path, with the intermediate dispensing path portion being proximate to said circumferential path of travel of said wash inlet connecting devices;
   c. each of said wash units and said wash liquid supply section being arranged to comprise abutment surfaces which comes into operative engagement when each wash inlet connection device is arriving at the engaging location to move the nozzle section along the liquid supply travel path in timed relationship with each related wash inlet connecting device moving along the circumferential path of travel to cause the liquid supply nozzle to come into operating with the wash inlet connecting device, the wash inlet connecting device remaining in operating engagement with the nozzle while traveling through the intermediate dispensing path portion, and coming out of operating engagement when the liquid supply nozzle reaches the release location;
   d. a valve actuator to cause each of said control valves to move from its first position to its second position for travel of the wash unit through the intermediate dispensing path portion, and then back to its first position.

2. The system as recited in claim 1, wherein the valve actuator is responsive to operative engagement and disengagement of the wash inlet connecting device and said nozzle section.

3. The system as recited in claim 1, wherein there is a wash cycle initiating device which is responsive to each of said wash inlet connecting device moving to a location proximate to said first engaging location to initiate a wash cycle subsequent to engagement of said wash inlet connecting device coming into initial engagement with the related nozzle section.

4. The system as recited in claim 3, wherein said wash cycle initiating device comprises a switch which is engaged by said wash liquid supply section in its movement along said liquid supply travel path.

5. The system as recited in claim 1, wherein said valve actuator is responsive to engagement of said wash liquid supply section coming into engagement with said wash inlet connecting device.

6. The system as recited in claim 5, wherein said liquid supply path extends from said first engaging location toward said circumferential path of travel of the wash unit to cause said valve actuator to move the control valve from the first position to the second position of the wash control valve.

7. The apparatus as recited in claim 1, wherein said nozzle section is arranged to move along said liquid supply travel path in a generally arcuate path of travel.

8. The system as recited in claim 7, wherein said valve actuator is arranged so that said back and forth travel is on a path having a substantial radial valve actuating component of travel toward and away from a center axis of rotation of said milking apparatus, and said nozzle section engages said valve actuator to cause movement along said actuating path.

9. The system as recited in claim 8, wherein said valve actuator has a yielding positioning device to urge said valve actuator to place the wash control valve in its first position, and said nozzle section has a valve actuating engaging portion to urge the valve actuator to its second position against the urging of said positioning means.

10. The system as recited in claim 9, wherein the valve actuating engaging portion of the nozzle section has a yielding positioning device which acts with a force greater than a force exerted by the yielding positioning device of the valve actuator, so that when said valve actuating engaging portion engages the valve actuator, the valve actuator moves to its second position, said system being further characterized in that when said valve actuator moves the control valve to its second position, then the valve actuating engaging portion moves against the urging of its yielding positioning device to cause the valve actuating engaging portion to retract, and upon disengagement of the valve actuating engaging portion with the valve actuating means, the valve actuator moves to cause the control valve to move to its first position, and said valve actuating engaging portion extends to be at its original position.

11. In combination a washing system and a rotary milking apparatus, said apparatus comprising a rotating support structure having a plurality of milking stations and a plurality of milking units located at respective milking stations, each milking unit having a milk transfer outlet to deliver milk to a collecting location, said washing system comprising:

a. a washing apparatus comprising a plurality of wash sections provided for its related milking units and mounted to the rotating support structure in a circumferentially spaced pattern around the milking apparatus, each wash section comprising:
  i. a wash inlet connecting device mounted to the milking apparatus to travel in a circumferential path of travel which passes through a washing location;
  ii. a wash control valve which is operatively connected to an outlet of its related milking unit and to its related wash inlet connecting device, each wash control valve having a first valve position to direct milk from its milking unit toward the collecting location and a second valve position to connect its related milking unit to its related wash inlet connecting device;
  iii. a valve control device movable between first and second control positions to position its related wash control valve in said first and unit valve positions;

b. a wash liquid supply section which is positioned at said washing location and has a liquid dispensing and valve actuating portion which is movable along a liquid supply path of travel from a first engaging location through an intermediate dispensing path, and to a release location;

c. said wash liquid supply section being positioned relative to the rotary milking apparatus, so that said liquid supply path of travel of the liquid dispensing and valve actuating portion of the wash liquid supply section extends from the engaging location into or adjacent to the circumferential path of travel of the wash inlet connecting devices, then through the intermediate dispensing path, and then away from the circumferential path of travel at the disconnecting location;

d. said liquid dispensing and valve actuating end portion being arranged to come into operating engagement with each of said wash inlet connecting devices and said valve control devices as the wash inlet connecting device arrives at the engaging location, so as to make a liquid dispensing connection with the wash inlet connecting device and to effect an operative connection with the valve control device to move the valve control device to said second control position so as to move the wash control valve to its second valve position to enable flow of wash liquid from the wash liquid supply section through the wash inlet connecting device and through the control valve to the milking unit, and as the liquid dispensing and valve actuating portion reaches the release location, the liquid dispensing and valve actuating portion comes out of operating engagement to disconnect with the wash inlet connecting device and to cause the control valve to return to its first valve position;

e. said supply section further comprising wash liquid supply source to deliver wash liquid to the wash inlet connecting device during the time period when the liquid dispensing and valve actuating end portion is traveling along the intermediate dispensing path.

12. The washing system as recited in claim 11, wherein said liquid dispensing and valve actuating portion comprises a dispensing nozzle which comes into operative engagement with said wash inlet connecting device at the engaging location to dispense wash liquid to said wash inlet connecting device during travel along the intermediate dispensing path and disconnects with said wash inlet connecting device at the release location.

13. The system as recited in claim 12, wherein said valve control device is operatively connected to the wash inlet connecting device, so that as the wash inlet connecting device is engaged by the dispensing nozzle, said dispensing nozzle causes the wash inlet control device to move to cause movement of the valve control device from its first to its second valve position.

14. The system as recited in claim 13 wherein there is valve control positioning device to urge the valve control device toward its first position, and said valve control device and said wash inlet connecting device are arranged so that at the release position, the dispensing nozzle moves out of engagement with the valve inlet connecting device so that the valve control device moves to the first position to move the control valve to its first position.

15. The system as recited in claim 14, wherein said nozzle is mounted in the wash supply section so as to move in a generally arcuate path from the engaging location to the release location so as to move toward and away from said wash inlet connecting device, said nozzle having nozzle positioning device urging said nozzle toward its engaging position with the wash inlet control device, in a manner that when said nozzle is moving through the intermediate dispensing path, said nozzle is able to retract against the urging of the nozzle positioning device and maintain engagement with the valve inlet device.

16. The system as recited in claim 15, wherein the nozzle positioning device exerts a greater force than the valve control positioning device, so that after initial engagement of the nozzle with the wash inlet connecting device, the valve control device is first moved to its second position, after which the nozzle is able to retract while maintaining engagement with the wash inlet connecting device.

17. The system as recited in claim 11, wherein said liquid dispensing and valve actuating portion has a valve actuating member which, during movement of the wash liquid supply section from its engaging position to the release position, moves against said valve control device to move the valve control device to the second position and release the valve control device at the release position to permit the valve control device to move back to its first position.

18. The system as recited in claim 17, wherein said valve actuating member has valve actuating positioning means urging the valve actuating member toward engagement with the valve control device, and to permit said valve actuating member to retract during the intermediate dispensing path s aid valve control device is in its second position.

19. The system as recited in claim 18, wherein said liquid dispensing and valve actuating portion comprises a dispensing nozzle which comes into operative engagement with said wash inlet connecting device at the engaging location to dispense wash liquid to said wash inlet connecting device during travel along the intermediate dispensing path and disconnects with said wash inlet connecting device at the release location.

20. The system as recited in claim 19, wherein said nozzle is mounted in the wash supply section so as to move in a generally arcuate path from the engaging location to the release location so as to move toward and away from said wash inlet connecting device, said nozzle having a nozzle positioning device urging said nozzle toward its engaging position with the wash inlet control device, in a manner that when said nozzle is moving through the intermediate dispensing path, said nozzle is able to retract against the urging of the nozzle positioning means and maintain engagement with the valve inlet device.

21. The system as recited in claim 11, wherein said liquid dispensing and valve actuating portion comprises a dispensing nozzle which comes into operative engagement with said wash inlet connecting device at the engaging location to dispense wash liquid to said wash inlet connecting device during travel along the intermediate dispensing path and disconnects with said wash inlet connecting device at the release location.

22. In combination a washing system and a rotary milking apparatus, said apparatus comprising a rotating support structure having a plurality of milking stations and a plurality of milking units located at respective milking stations, each milking unit having a milk transfer outlet to deliver milk to a collecting location, said washing system comprising:

a. a washing apparatus comprising a plurality of wash sections provided for its related milking units and mounted to the rotating support structure in a circumferentially spaced pattern around the milking apparatus, each wash section comprising:
  i. a wash inlet connecting device mounted to the milking apparatus to travel in a circumferential path of travel which passes through a washing location;
  ii. a wash control valve which is operatively connected to an outlet of its related milking unit and to its related wash inlet connecting device, each wash control valve having a first valve position to direct milk from its milking unit toward the collecting location and a second valve position to connect its related milking unit to its related wash inlet connecting device;

b. a wash liquid supply section which is positioned at said washing location and has a nozzle section with a dispensing nozzle mounted for back and forth motion along a generally curving path which has a first end portion and a second end portion and which overlaps the circumferential path of the wash inlet connecting devices at an overlapping region of the washing location, said dispensing nozzle having an engaging location which is adjacent the first end portion of the curving path and a release location at the send end portion of the curving path, said curving path having an intermediate path portion at the overlapping region, said nozzle section being arranged to travel from the engaging location to the release location for a wash cycle and from the release location back to the engaging location on a return path of travel;

c. each of said wash sections having a wash section engaging portion which travels with said rotating support structure on a generally circumferential path, and said nozzle section of the wash liquid supply section has a nozzle section engaging portion having an engaging location at or adjacent to the circumferential path of the wash section engaging portions, the wash section engaging portions and the nozzle section engaging portions being arranged to come into engagement as the wash inlet connecting device of each wash section is arriving at the engaging location to cause the nozzle section to move in timed relationship with the wash inlet connecting device to cause the nozzle section to move along said generally curving path into engagement with the wash inlet connecting device, with the nozzle and the wash inlet connecting device remaining in engagement while traveling along the intermediate path portion;

d. said wash supply section having liquid supply source to direct liquid through the nozzle and the wash inlet connecting device to the control valve during the washing cycle, said washing system having valve control mechanism to position said wash control valve in its second position during the wash cycle and return the wash control valve to its first position at the end of the washing cycle.

23. In combination a washing system and a rotary milking apparatus, said apparatus comprising a rotating support structure having a plurality of milking stations and a plurality of milking units located at respective milking stations, each milking unit having a milk transfer outlet to deliver milk to a collecting location, said washing unit comprising:

a. a washing inlet comprising a plurality of wash units mounted to said rotating support structure in a circumferentially spaced pattern, each wash section comprising:
  i. a wash connecting device positioned to travel in a circumferential path of travel which passes through a washing location;
  ii. a wash control valve which is operatively connected to the outlet of its related milking unit and to its related wash inlet connecting device, said wash control valve having a first position to direct milk from its milking unit toward the collecting location and a second position to connect its related milking unit to its related wash inlet connecting device;

b. a wash liquid supply section which is positioned at said washing location and which has a nozzle section comprising a support member and a liquid supply nozzle mounted thereto, said nozzle being arranged to come into operating engagement with each of said wash inlet connecting devices to deliver wash liquid into each of said wash inlet connecting devices, said nozzle section being mounted for back and forth travel to carry said liquid supply nozzle along a liquid supply travel path from a first engaging location, through an intermediate dispensing path portion of said liquid supply travel path, to a release location along said liquid supply travel path, with the intermediate dispensing path portion being proximate to said circumferential path of travel of said wash inlet connecting devices;

c. said wash liquid supply section having a positioning abutment portion mounted to the nozzle section and located to come into contact with abutment surface portions which are provided for related wash units to travel with the rotating support structure and to come into engagement with the positioning abutment portion of the nozzle section as the wash inlet connecting device is arriving at the engaging location to move the nozzle section along the liquid supply travel path in timed relationship with each related wash inlet connecting device moving along the circumferential path of travel to cause the liquid supply nozzle to come into operating with the wash inlet connecting device, the wash inlet connecting device remaining in operating engagement with the nozzle while traveling through the intermediate dispensing path portion, and coming out of operating engagement when the liquid supply nozzle reaches the release location;

d. valve actuator to cause each of said control valves to move from its first position to its second position for travel of the wash unit through the intermediate dispensing path portion, and then back to its first position.

* * * * *